United States Patent [19]
Hahn

[11] Patent Number: 5,689,537
[45] Date of Patent: Nov. 18, 1997

[54] JET PUMP BEAM TENSIONER

[75] Inventor: Joseph James Hahn, Pittsburgh, Pa.

[73] Assignee: Westinghouse Electric Corporation, Pittsburgh, Pa.

[21] Appl. No.: 620,477

[22] Filed: Mar. 22, 1996

[51] Int. Cl.$^6$ ..................................................... C21C 19/00
[52] U.S. Cl. ............................. 376/260; 29/252; 29/723; 81/57.38
[58] Field of Search .................................... 376/260, 372, 376/392, 407; 29/252, 260, 261, 262, 426.5, 464, 723; 81/57.38; 254/29 A, 93 A; 294/67.31

[56] References Cited

U.S. PATENT DOCUMENTS

| | | | |
|---|---|---|---|
| 4,406,047 | 9/1983 | Jeffers et al. | 29/426.5 |
| 4,499,691 | 2/1985 | Karazim et al. | 376/260 |
| 4,535,656 | 8/1985 | Orban | 376/260 |
| 4,675,149 | 6/1987 | Perry et al. | 376/260 |
| 4,995,158 | 2/1991 | Howell et al. | 29/723 |
| 5,070,589 | 12/1991 | Howell et al. | 376/260 |

OTHER PUBLICATIONS

*Instructions—Jet Pump Tensioner,* GEK-33220, [undated], pp. 1–16.

*Primary Examiner*—Daniel D. Wasil

[57] ABSTRACT

An apparatus for tensioning a hold down beam of a nuclear reactor jet pump inlet mixer is configured to be inserted in a confined annulus between a core shroud and a reactor vessel of a nuclear reactor. The hold down beam includes a beam body, a pair of opposed beam tabs and a pair of opposed beam trunnions extending outwardly from the beam body, and a threaded beam bolt received within a threaded channel extending through the beam body. The tensioning apparatus includes a housing having a lower base plate and an upper support plate positionable over the body of the hold down beam, rotatable trunnion engaging members for engaging the beam trunnions, reciprocating members coupled to the upper support plate and lower base plate for engaging the inlet mixer adjacent to the beam trunnions, and an actuator mounted between the upper support plate and lower base plate and extending through the lower base plate for selectively actuating the trunnion engaging members. Tensioning of the hold down beam is accomplished by positioning the hold down beam on an upper surface of the inlet mixer with each beam tab under an inlet riser bracket of the jet pump. The tensioning apparatus is then placed over the hold down beam, followed by rotating the trunnion engaging members into engagement with the trunnions, extending the reciprocating members to engage the inlet mixer and to force the beam tabs against the inlet riser brackets to thereby extend an opening between the hold down beam and the upper surface of the inlet mixer, rotating the beam bolt to extend the bolt into contact with the upper surface of the inlet mixer, and removing the tensioning apparatus from engagement with the tensioned hold down beam.

17 Claims, 6 Drawing Sheets

JET PUMP BEAM TENSIONER

BACKGROUND OF THE INVENTION

1. Field of the Invention

The invention relates generally to an apparatus and process for servicing nuclear reactors. More particularly, the invention relates to the servicing of jet pump hold down beams which are used to secure the position of reactor coolant jet pumps in the reactor.

2. Background Information

Jet pumps are used in a variety of different types of nuclear reactors for circulating moderator fluid such as cooling water through a reactor core located within the pressure vessel of the reactor structure. Reactors such as boiling water reactors can employ as many as twenty or more downwardly-directed jet pumps mounted in an annulus between the reactor vessel wall and the reactor shroud. Each of the pumps recirculates reactor core moderator coolant fluid such as water by forcing high volumes of the fluid through a venturi nozzle, which then draws surrounding fluid into the pump for circulation. Fluid volumes of on the order of about 94,500 liters per minute (25,000 gallons per minute) can be obtained from each of the jet pumps. Because of the forces associated with the circulation of such high volumes of fluids, jet pump hold down beams are provided to secure the pump in position throughout pump operation. The hold down beams are pre-tensioned with up to about a 13,600 kilograms (30,000 pounds) preload per beam under shoulders formed in a pair of opposed jet pump riser brackets.

Jet pump hold down beams of existing boiling water reactors typically consist of three components. A beam body, a pair of opposed tabs extending outwardly from the beam body, and a threaded beam bolt extending through a correspondingly-threaded channel formed in the beam body. Beam tensioning and detensioning is accomplished by rotation of the beam bolt in the appropriate direction. A beam-bolt retainer assembly can be provided to stabilize the position of the beam and accompanying beam bolt with respect to the jet pump. The retainer assembly includes a retainer plate having a channel formed therein for receiving the beam bolt and abutting against a flanged end of the beam bolt, and a retainer bolt for coupling the retainer plate to the jet pump. A keeper collar can be provided to rotatably fix the position of the beam bolt within the threaded channel of the beam. The keeper collar is insertable over the upper end of the beam bolt and tack welded to a weld plate coupled to the beam to provide a force resistive to rotational movement of the beam bolt.

Several problems with existing jet pump hold down beams in boiling water reactor plants have been discovered during the course of routine reactor servicing, such as during refueling outages. One problem has been the occurrence of cracking of the tack welds of the beam bolt keepers. Tack weld cracking necessitates re-welding of the keeper to the beam, a difficult procedure to perform under water and in the narrow confines of the reactor annulus. A more serious problem has been the discovery of hold down beam cracks and fissures. Metallurgical studies have revealed the cause of the beam failure to be the result of intergranular stress corrosion cracking, arising from chemical interaction between the beam alloy material and the moderator fluid. These cracked beams must be removed from the jet pump and replaced with new beams. In order to minimize reactor down time, it is desirable to conduct hold down beam replacement during reactor fuel changeovers. However, because the hold down beams are positioned in a relatively narrow annulus between the core shroud and the reactor vessel wall and are submerged in radioactively contaminated moderator fluid at a depth of about 10 meters (30 feet) below the level of the reactor vessel flange, jet pump hold down beam servicing has been a labor-intensive, time consuming, expensive, and hazardous procedure.

Many of the difficulties associated with jet pump hold down beam replacement arise from the considerable health and safety considerations associated with the design and construction of power generating nuclear reactors. For example, the reactor vessel of a conventional boiling water reactor is submerged in the concrete floor of a floodable refueling cavity and is covered by a vessel head detachably mounted to the vessel flange. In order to obtain access to the jet pump hold down beams of the boiling water reactor, the refueling cavity must first be flooded with moderator fluid such as water so that the vessel head is immersed in about 15–20 meters of moderator fluid. Only after the refueling cavity has been flooded can the vessel head be safely uncoupled from the vessel flange and various reactor components removed therefrom. Removal of the vessel head and reactor components is accomplished from a refueling platform extending across the top of the refueling cavity. Thereafter, in known servicing techniques, the fluid is drained from the refueling cavity and the cavity walls and floor are scrubbed and decontaminated. A service platform from which hold down beam servicing is to be effected may then be assembled across the reactor flange, and designated hold down beams may be removed and replaced. A bolt keeper is tack welded to the top of the beam, and proper moderator fluid chemistry and clarity is restored. The service platform may then be removed, and the vessel head may be re-installed on the vessel flange. Due to the difficulties presented by this known servicing procedure, the time required to replace the hold down beam of a single jet pump has in the past been on the order of about three days. As there are twenty or more jet pumps spaced about the periphery of the reactor annulus, and because prudence dictates the replacement of all of the hold down beams where abnormalities are found with one or more of the beams, it is readily apparent that jet pump hold down beam servicing is a significant service procedure, resulting in a substantial amount of reactor down time.

Various tools have been used in the past for effecting hold down beam replacement. For example, U.S. Pat. No. 4,406,047 discloses an apparatus and procedure for replacing the jet pump hold down beam in which the beam is forced out from the retainer channel following beam rotation and beam bolt loosening by a separate apparatus. A principal drawback to this arrangement is that the beam retainer assembly remains bolted in place to the upper end of the jet pump. Therefore, in order to install a replacement hold down beam, the lower end of the beam bolt of the replacement beam must first be inserted into the retainer plate in order to properly position the beam with respect to the upper end of the jet pump and the opposed bracket members extending therefrom. Because of the narrow dimensions of the jet pump annulus, manipulation of the replacement beam so as to properly fit within the retainer assembly is difficult to accomplish.

In an effort to expedite hold down beam replacement, apparatus for cutting the beam retainer plate from the jet pump have been proposed. One example of such an apparatus is disclosed in U.S. Pat. No. 4,499,691. This patent discloses a device for cutting the hold down beam retainer plate so that a portion of the severed plate is removed with the beam, whereas the remaining plate-anchoring portion is left coupled to the jet pump. However, because this apparatus involves cutting of the retainer plate adjacent to its position of installation on top of the jet pump, operation of this apparatus is accompanied by the risk that metal shards produced incident to retainer plate cutting will become entrained in the surrounding reactor moderator fluid and pumped throughout the reactor, thereby increasing the risk of reactor failure and attendant down time.

U.S. Pat. Nos. 4,995,158 and 5,070,589 disclose an improved apparatus and method for servicing jet pump hold down beams in a nuclear reactor. The apparatus includes means for tensioning the beam by pulling up on a pair of opposed trunnions extending from the center of the beam while pressing down on a pair of tabs located at the ends of the beam to thereby deform the beam. Once the beam is deformed, a threaded bolt extending through the center of the beam and in contact with the inlet mixer is tightened to elevate the end tabs of the beam into contact with a pair of inlet riser brackets. After the bolt is tightened and the end tabs are in contact with the riser brackets, the apparatus is removed from the tensioned beam. While the apparatus is effective in many operations, the requirement of pushing down on the end tabs of the beam has some drawbacks. For example, the end tabs of the beam are often radiused, making it difficult to press down thereon. In addition, in many installations the available surface area of the beam tabs is too small to provide a sufficient pressing surface.

Each of the U.S. patents cited above is incorporated herein by reference.

The present invention has been developed in view of the foregoing limitations and drawbacks of the prior art.

SUMMARY OF THE INVENTION

The invention relates generally to an apparatus and method for tensioning the hold down beam of a fluid-circulating jet pump for a nuclear reactor in which the beams generally have a structure consisting of a beam body, a pair of opposed beam tabs extending outwardly from the beam body, a pair of opposed beam trunnions, and a threaded beam bolt extending through a correspondingly-threaded channel formed in the beam body. The hold down beams are provided to secure the position of a jet pump between opposed bracket members within an annulus formed between the reactor shroud and the reactor vessel wall. Because the annulus is relatively narrow, being on the order of about 30 cm. (12 in.) wide, and because the jet pumps are immersed in radioactively-contaminated moderator fluid, it is desirable to effect servicing of the hold down beams from a position remote from the nuclear reactor. Accordingly, the invention described herein discloses an apparatus and method for effecting tensioning of the hold down beams from a control position above the surface of the moderator fluid so as to minimize health hazards associated with personnel working in close proximity to the nuclear reactor.

The apparatus and method of the invention are particularly beneficial when used in conjunction with reactor fuel removal and replacement procedures, during which a refueling cavity surrounding the reactor and extending from the reactor vessel flange is flooded with moderator fluid such as water to submerge the vessel flange and components contained therein under about 25–30 meters of water following removal of the vessel head from the vessel flange. The disclosed apparatus and method provide for jet pump hold down beam tensioning from the refueling bridge extending across the upper end of the refueling cavity above the fluid-filled cavity, thereby further isolating reactor servicing personnel from harmful radiation emitted from the reactor.

An object of the present invention is to provide an improved jet pump beam tensioning fixture that can be inserted in a confined annulus between a core shroud and a reactor vessel of a boiling water nuclear reactor.

Another object of the present invention is to provide an apparatus for tensioning a hold down beam of a nuclear reactor jet pump inlet mixer, the apparatus including a housing having a lower base plate and an upper support plate positionable over the body of a hold down beam, rotatable members for engaging the hold down beam, reciprocating members coupled to the upper support plate and lower base plate for engaging the inlet mixer adjacent to the beam trunnions, and an actuating member extending through the lower base plate for actuating the trunnion engaging members.

Another object of the present invention is to provide an improved method of tensioning a hold down beam of a nuclear reactor jet pump inlet mixer, the method including positioning a hold down beam on an upper surface of the inlet mixer with its end beam tabs under an inlet riser bracket of the jet pump, positioning a tensioning apparatus over the hold down beam, rotating trunnion engaging members of the tensioning apparatus into engagement with the beam trunnions, extending reciprocating members to engage the inlet mixer and force the beam tabs against the inlet riser brackets to thereby extend an opening between the hold down beam and the upper surface of the inlet mixer, rotating a beam bolt to extend the bolt into contact with the upper surface of the inlet mixer, and removing the tensioning apparatus from engagement with the hold down beam.

DESCRIPTION OF THE PREFERRED EMBODIMENT

Figure 1:
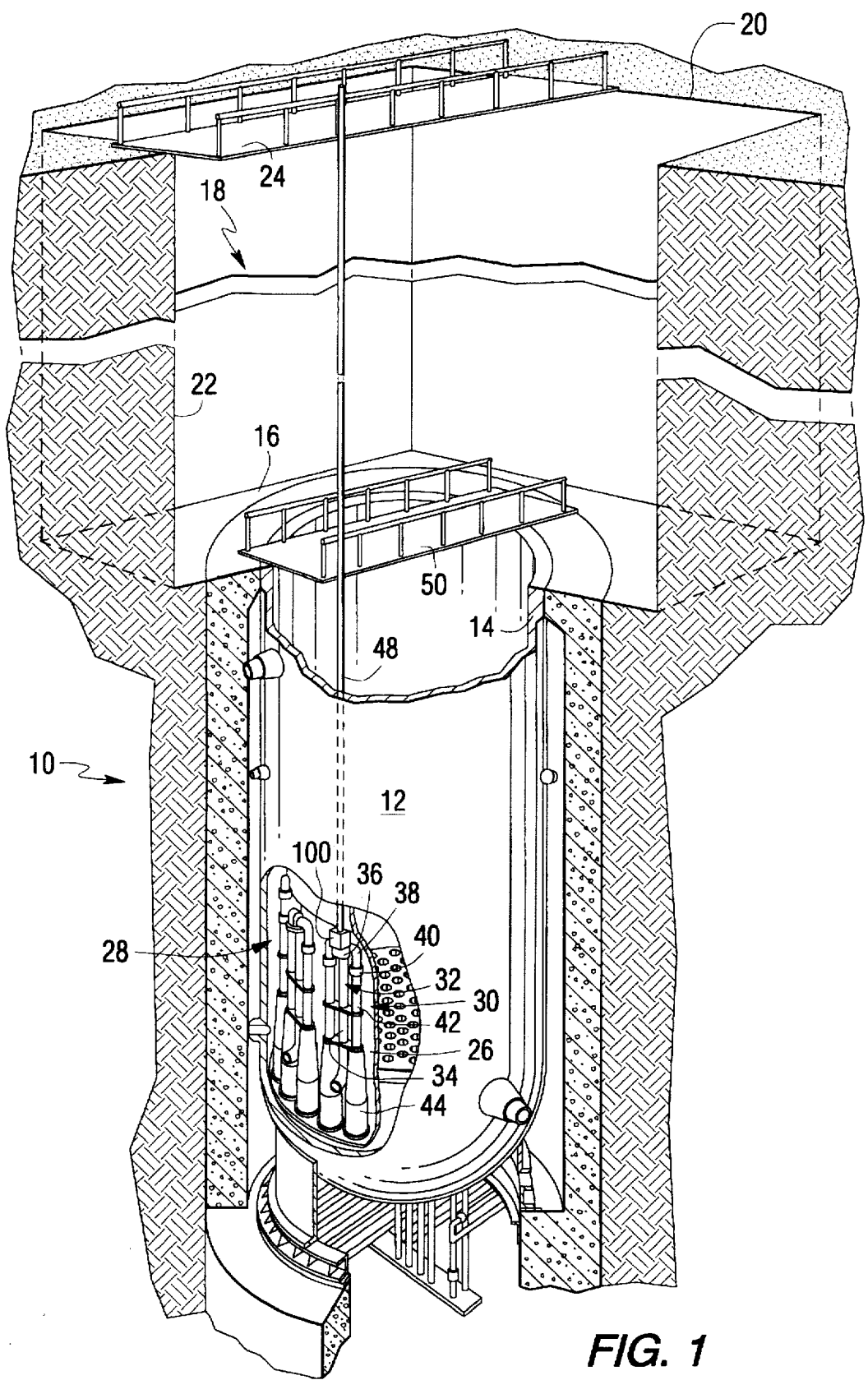
FIG. 1 is a partially cut away, perspective view of a nuclear power plant in which use of the invention is partially applicable.

With reference to the drawings, wherein like reference numerals represent like components throughout the various drawing figures, and with particular reference to FIG. 1, a boiling water reactor in which the apparatus and method of the present invention are applicable is depicted in partially schematic form and designated, generally by reference numeral 10. Details of the reactor structure which are not relevant to the description of the invention are not depicted in the drawing. It is to be appreciated, however, that the method and apparatus described hereinbelow are not to be construed as being limited solely to use in boiling water reactors. The reactor 10 includes a generally cylindrical reactor vessel 12 which is removably sealed by a vessel head (not shown) at the vessel flange 14. The reactor vessel 12 houses various reactor components and, when the vessel head is coupled thereto, isolates these components from the external environment to provide a generally closed reactor system. The reactor vessel 12 is mounted in the floor 16 of a selectively floodable refueling cavity 18. The refueling cavity 18 is flooded with a suitable moderator fluid such as water prior to removal of the reactor vessel head and replacement of the reactor fuel supply. The refueling cavity 18 extends from a surface 20 and is defined by sidewalls 22 which typically extend a distance of from about fifteen to about thirty meters from the floor 16 to the surface 20. A reactor refueling bridge 24 extends between the cavity sidewalls 22 and provides a work area from which reactor replenishment of fuel and the jet pump hold down beam tensioning of the present invention may be controlled. The moderator fluid filling the refueling cavity 18 provides for absorption of radioactive emissions from the reactor vessel following vessel head removal. A containment vessel (not shown) can optionally be provided to further isolate the reactor vessel.

The reactor vessel houses a generally cylindrical reactor core shroud 26 spaced from the vessel wall. An annulus 28 is provided between the core shroud 26 and reactor vessel 12. The annulus 28 is substantially filled with a suitable reactor moderator fluid such as water which is circulated throughout the reactor by a plurality of jet pump assemblies 30. Each jet pump assembly comprises a pair of jet pumps 32 which are fed with a supply of fluid through an inlet riser 34. Fluid passing through the inlet riser 34 is delivered to each of the pumps 32 through a riser manifold 36 positioned atop the inlet riser. The riser manifold 36 directs fluid into two opposed inlet mixers 38 which re-direct the fluid flow downward past a venturi nozzle 40 and into a pump throat 42. Fluid flows from the throat 42 into a diffuser 44 into the lower periphery of the reactor core (not depicted). A boiling water reactor typically includes as many as ten or more jet pump assemblies 30 circumferentially spaced about the annulus 28. Each jet jump 32 of the pump assembly 30 is capable of pumping approximately 75,500 liters (20,000 gallons) of moderator fluid per minute to effect uniform cooling of the reactor.

In accordance with one embodiment of the present invention, the jet pumps 32 are serviceable by a beam tensioning apparatus depicted generally by box 100, interchangeably mounted at the lower end of a modular, readily assemblable rigid pole 48 such as that of the type manufactured by ASEA-ATOM of Vasteras, Sweden. The tensioning apparatus 100 can be manipulated into a desired position adjacent the jet pumps 32 from the reactor refueling bridge 24. Alternatively, a service platform 50 may be installed across the reactor vessel flange 14 following draining and decontamination of the refueling cavity 18 in order to perform the beam tensioning operation. One or more remotely controllable video cameras (not depicted) can be submerged in the moderator fluid and controlled from the refueling bridge 24 to assist in guiding the tensioning apparatus 100 into position adjacent the jet pumps. The ability to service the jet pump 32 from a position as remote from the jet pumps 32 as that of the refueling bridge 24 is particularly advantageous because working from such a position, through approximately 25–30 meters of moderator fluid when the refueling cavity 18 is filled with water, greatly reduces the exposure of reactor servicing technicians to radioactive emissions from the reactor. Further, because the tensioning apparatus 100 can be accurately and effectively positioned from the refueling bridge while the refueling cavity is still filled incident to vessel head removal, jet pump beam tensioning can be conducted in a manner which altogether avoids the time, expense and resources associated with draining and decontamination of the refueling cavity.

Figure 2:
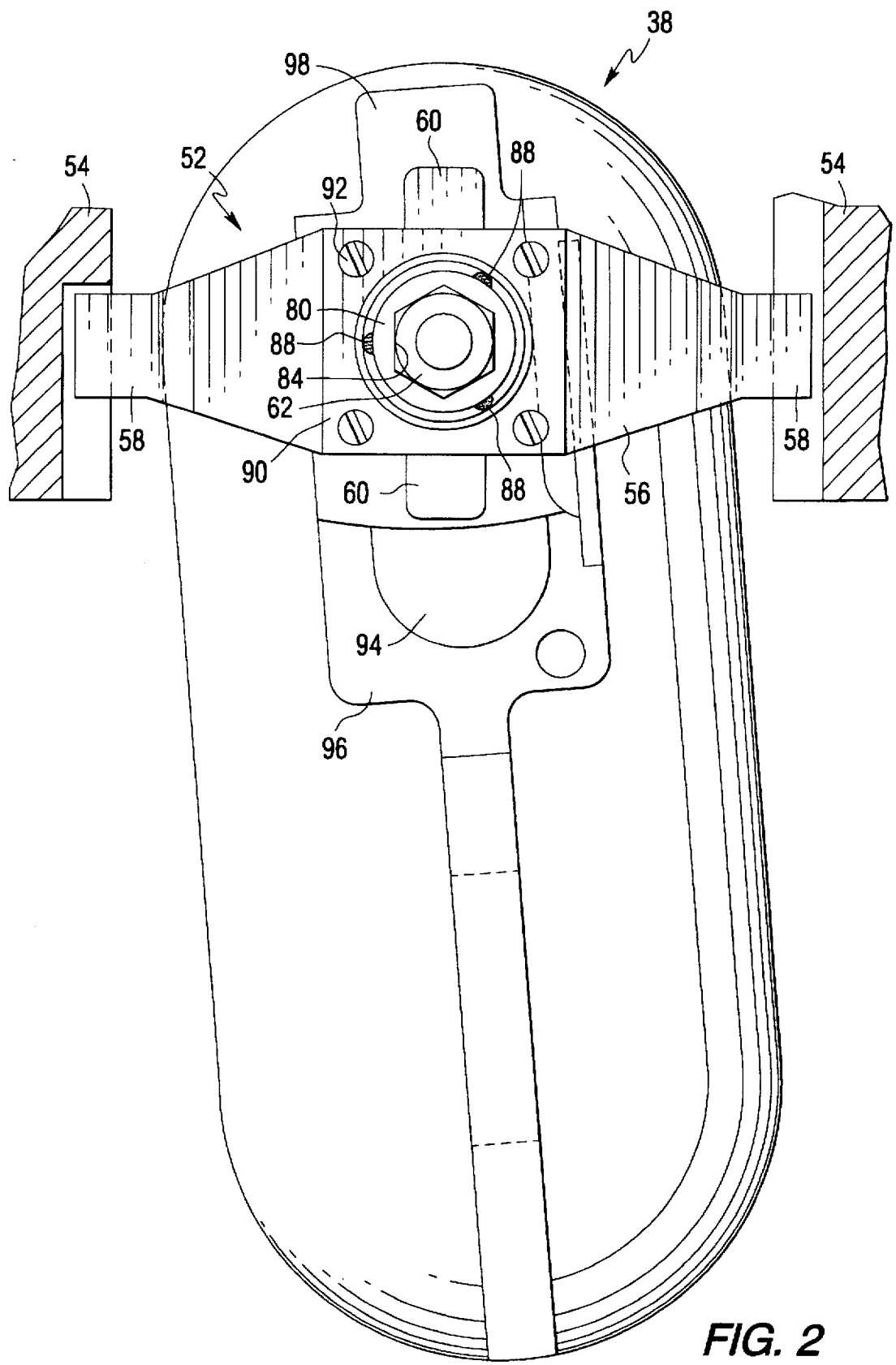
FIG. 2 is a top elevational view of a jet pump and jet pump hold down beam illustrating details of the beam and beam mounting within the reactor annulus.
Figure 3:
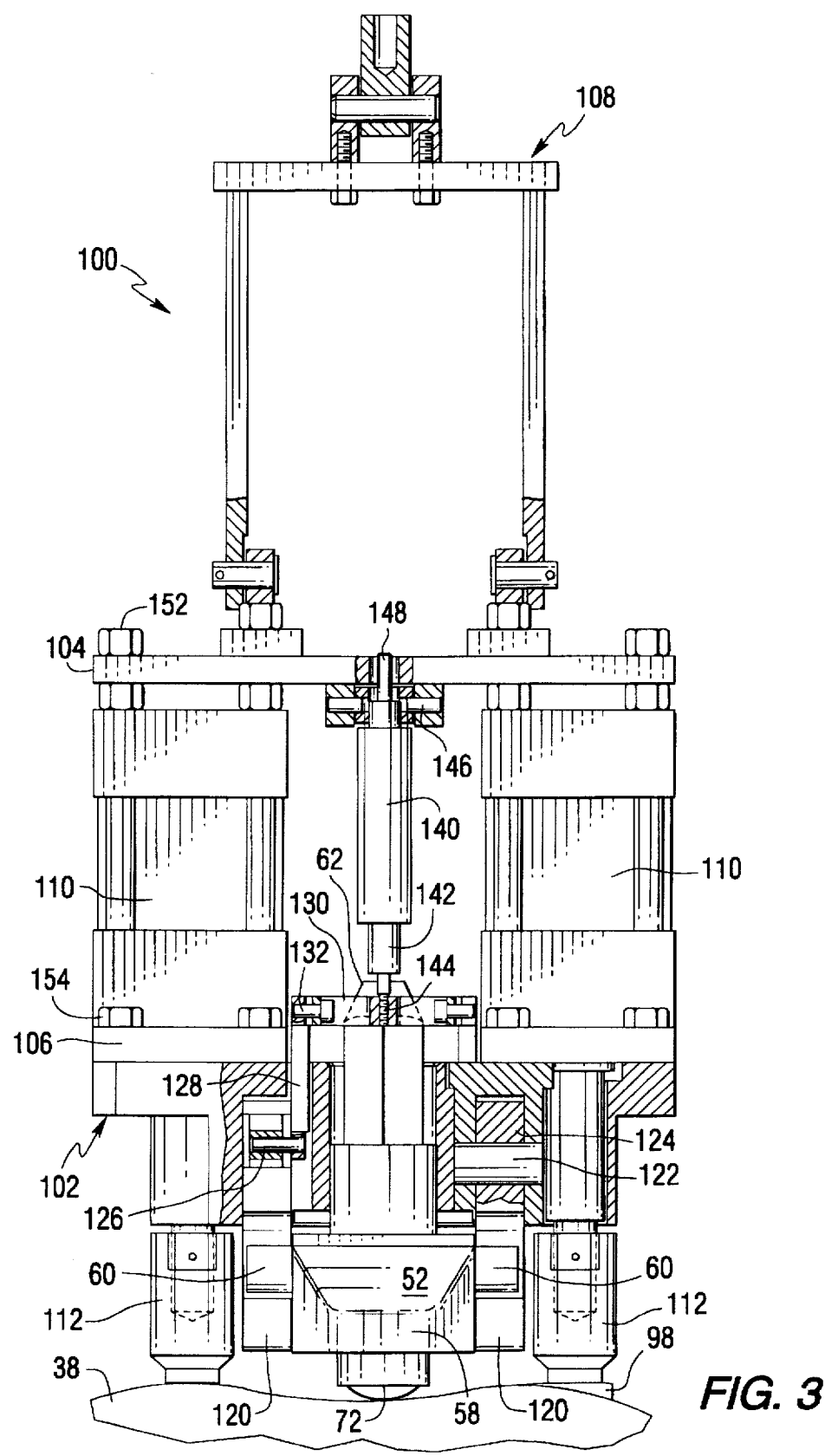
FIG. 3 is a front partial section view of a jet pump beam tensioner fixture in accordance with the present invention.

With reference to FIG. 2, there is depicted a jet pump hold down beam 52 and its mounting arrangement between a pair of opposed riser brackets 54 extending from the riser manifold 36. One hold down beam 52 is provided to secure the inlet mixer 38 of each jet pump 32 within the riser manifold 36. Each hold down beam 52 comprises a beam body 56 from which extend along a longitudinal axis of the beam a pair of opposed beam tabs 58. Extending transversely of the longitudinal axis from the beam body is a pair of opposed beam trunnions 60 for facilitating tensioning of the hold down beam relative to the jet pump 32. A threaded beam bolt 62 extends through a correspondingly-threaded channel formed in the beam body 56. The beam bolt 62 may be rotated in order to tension the hold down beam 52 through the use of the beam tensioning apparatus 100 of the present invention. The beam bolt 62 comprises a convex bolt flange 72, as shown in FIG. 3, which extends outwardly from the bottom of the beam 52. A bolt keeper 80 defining a keeper aperture for receiving the head of the bolt 62 can be provided to rotatably fix the position of the beam bolt. The keeper 80 preferably includes a plurality of aperture sidewalls 84 configured to closely surround the facets of the bolt 62. The keeper 80 is typically tack welded at one or more weld sites 88 to a keeper plate 90 secured to an upper surface of the beam body 56 by threaded fasteners 92.

The hold down beam 52 is initially installed adjacent the upper end of the jet pump inlet mixer 38 such that the flanged end 72 of the beam bolt 62 abuts against a concave recess formed in a channel surface 94 formed in a flange 96 extending from the inlet mixer. The inlet mixer flange 96 includes a shoulder 98 which serves as a bearing surface for the beam tensioner fixture of the present invention.

Figure 4:
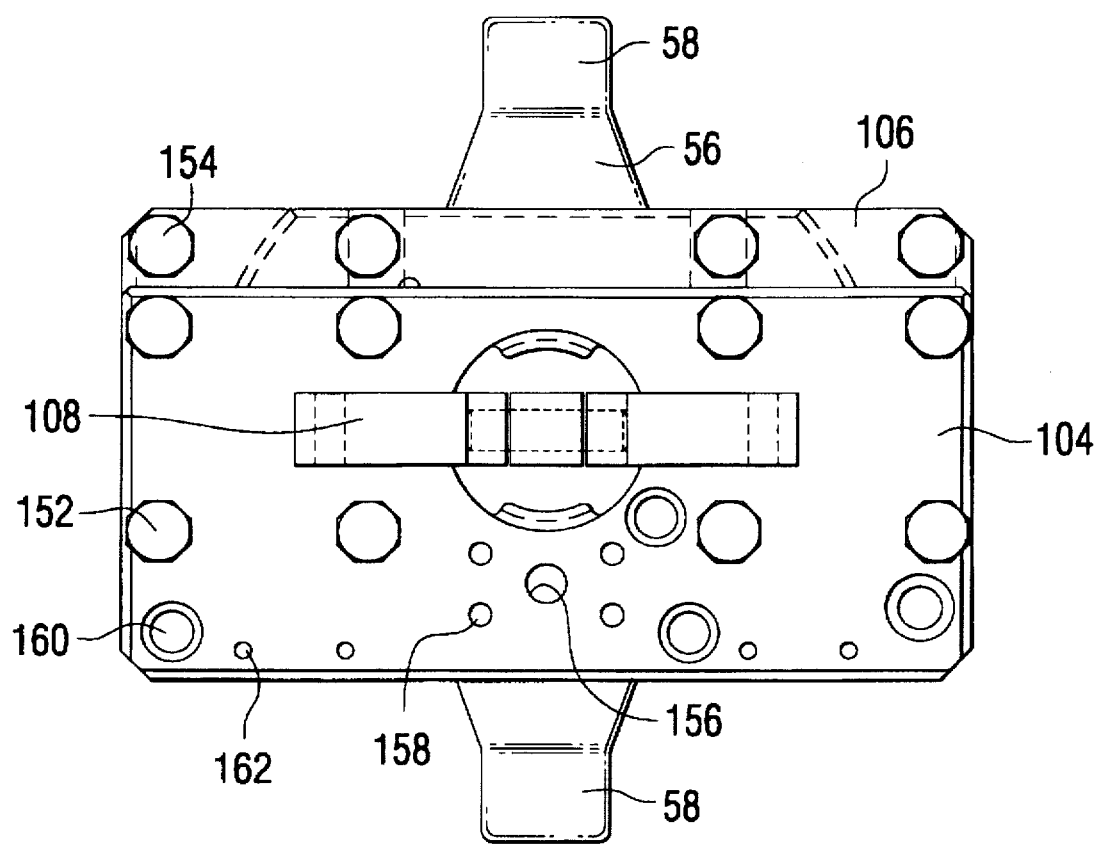
FIG. 4 is a top elevational view of the jet pump beam tensioner of FIG. 3.
Figure 5:
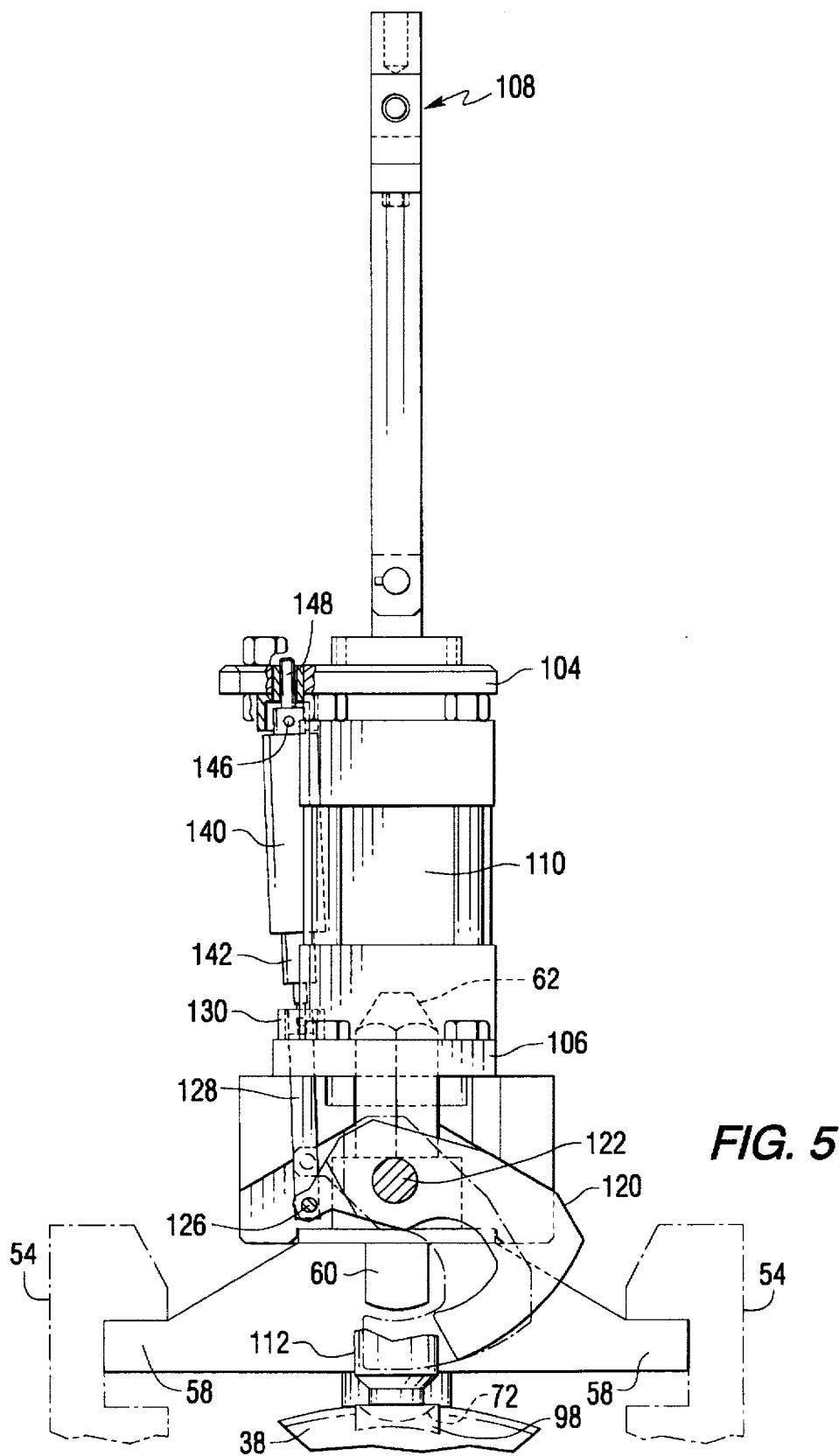
FIG. 5 is a side partial section view of the jet pump beam tensioner fixture of FIG. 3 showing a trunnion engaging hook in a disengaged position and in an engaged position.

FIGS. 3, 4 and 5 are front, top and side views, respectively, of a hold down beam tensioning apparatus 100 in accordance with a preferred embodiment of the present invention. The tensioning apparatus 100 comprises a housing 102 having an upper support plate 104 and a lower base plate 106. A hanger assembly 108 is mounted on the upper support plate 104 for raising and lowering the beam tensioning apparatus 100 within a confined annulus between a core shroud and a nuclear reactor vessel. Hydraulic cylinders 110 are mounted between the upper support plate 104 and lower base plate 106 by bolts or other suitable fasteners. Each hydraulic cylinder 110 includes a reciprocating ram 112 which may be extended from the cylinder body to contact the flange 96 of the inlet mixer 38 during operation.

Trunnion engaging hooks 120 are rotatably mounted on the lower base plate 106 by means of pivot pins 122. Each trunnion engaging hook 120 is pivotably mounted within a mounting box 124 which is fastened to the lower base plate 106 by bolts or the like. An actuating pin 126 is inserted in an aperture in each trunnion engaging hook 120. The actuating pins 126 are mounted on actuating rods 128, which extend through the lower base plate 106 and are connected to an actuating bar 130 by means of fasteners 132. The actuating bar 130 is coupled to an actuating cylinder 140 by means of an extendable actuating piston 142 having an end portion 144 threaded into the actuating bar.

The actuating cylinder 140, which is preferably pneumatically operated, is mounted on the upper support plate 104 by means of a pivot mounting 146. An indicating rod 148 extends from the actuating upper support plate 104. The aperture 156 in the upper support plate 104. The indicating rod 148 moves with the actuating piston 142 and provides a visual indication to the operator of whether the hooks 120 are engaged with the beam trunnions 60. As shown most clearly in FIG. 4, a plurality of fasteners 158 are used to secure the pivot mounting 146 to the upper support plate 104. A plurality of fasteners 152, 154 such as bolts or the like are used to secure the hydraulic cylinders 110 to the upper support plate 104 and lower base plate 106. The upper support plate 104 includes a plurality of thru holes 160 which are used for hydraulic fittings (not shown) for the hydraulic cylinders 110 and the actuating cylinder 140. The upper support plate 140 also includes a plurality of smaller thru holes 162 which may optionally be used to connect a protective sheet metal shroud (not shown) around the housing 102.

Figure 6:
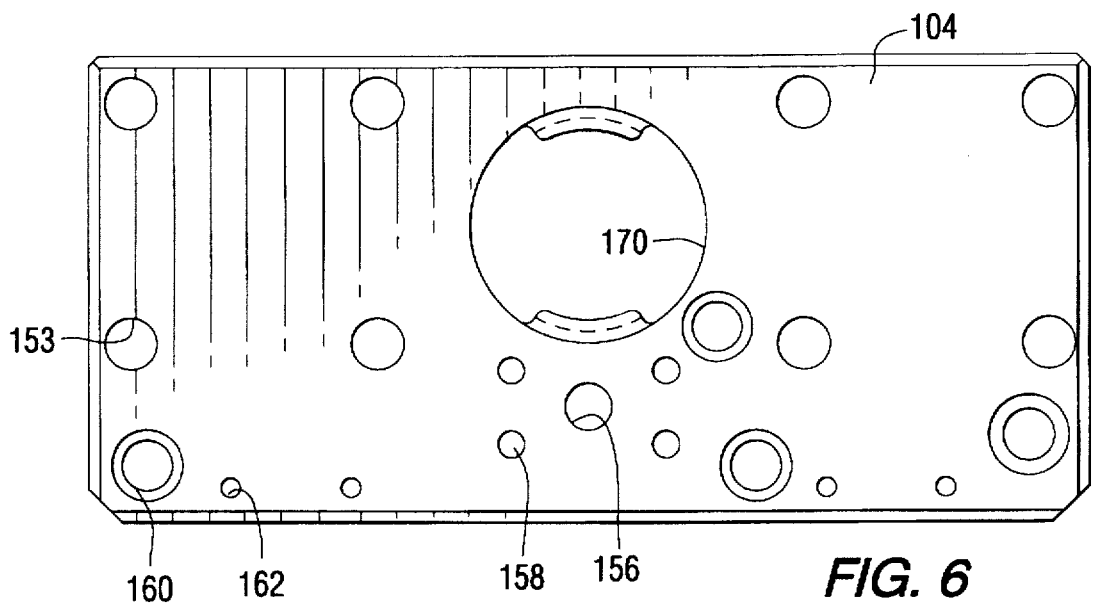
FIG. 6 is a top elevational view of an upper support plate which forms part of the jet pump beam tensioner of the present invention.

As shown most clearly in FIG. 6, the upper support plate 104 includes a central aperture 170 which allows a torque tool to access to the hold down beam bolt during the tensioning operation, as more fully described below. A plurality of thru holes 153 are provided in the upper support plate 104 for fastening the hydraulic cylinders 110 thereto.

Figure 7:
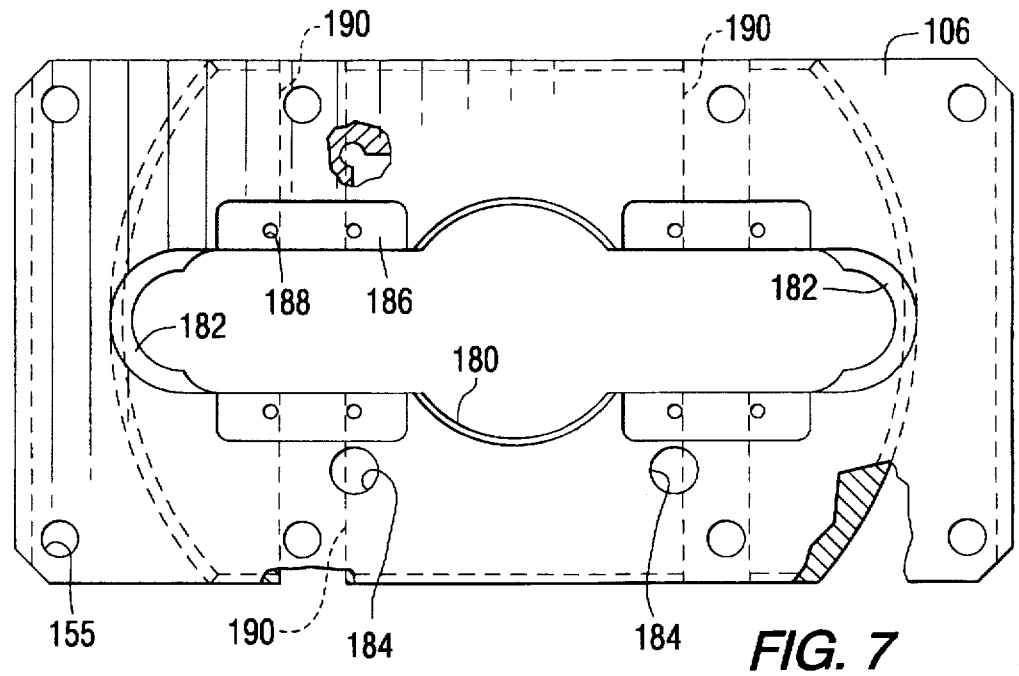
FIG. 7 is a top partial section view of a lower base plate which forms part of the jet pump beam tensioner of the present invention.

FIG. 7 is a top view of the lower base plate 106 in accordance with a preferred embodiment of the present invention. The lower base plate 106 includes a central aperture 180 which likewise allows a torque tool to be inserted through the tensioning apparatus in order to access the hold down beam bolt during the tensioning operation. The lower base plate 106 also includes a pair of ram apertures 182 which allow the reciprocating rams 112 of the hydraulic cylinders 110 to pass through the lower base plate 106 in order to press against the flange 96 of the riser manifold 36. The lower base plate 106 further includes actuating rod apertures 184 which permit the actuating rods 128 to extend therethrough in order to actuate the trunnion engaging hooks 120. A plurality of thru holes 155 are provided in the lower base plate 106 for mounting the hydraulic cylinders 110 thereto. The lower base plate 106 includes mounting surfaces 186 upon which the mounting boxes 124 for the trunnion engaging hooks 120 are seated. A plurality of mounting holes 188 are provided through the mounting surfaces 186 for fastening the mounting boxes 124 to the lower base plate 106 by means of bolts or other suitable fasteners. Slots 190 are provided in the lower base plate 106 in order to allow clearance for the trunnion engaging hooks 120 to rotate.

As shown most clearly in FIG. 5, each trunnion engaging hook 120 is rotable about the pivot pin 122 from a disengaged position to an engaged position (shown in phantom) in which each trunnion engaging hook 120 is positioned under a beam trunnion 60 of the hold down beam. In order to disengage the hooks 120 from the beam trunnions 60, the actuating cylinder 140 is pressurized to extend the actuating piston 142 and actuating bar 130 toward the lower base plate 106 to the position shown in FIG. 5. Upon extension of the actuating piston 142, the actuating bar 130 forces the actuating rods 128 downward through the lower base plate 106 against the actuating pins 126 in order to rotate the trunnion engaging hooks 120 about the pivot pins 122 counterclockwise as shown in FIG. 5.

In comparison with prior art designs, the hold down beam tensioning apparatus of the present invention comprises a compact unit in which the actuating cylinder 140 for the trunnion engaging hooks 120 is centrally located within the fixture instead of extending outwardly from the side thereof. The geometry of the engaging hooks advantageously provides a relatively large swing arm for the hooks 120 with only a small travel distance of the actuating piston 142. The centrally located actuating cylinder 140 also provides a uniform pressing force against the actuating rods 128 by means of the actuating bar 130 in order to ensure that the hooks are Simultaneously engaged with the beam trunnions 60.

In accordance with the present invention, the beam tensioning apparatus is positioned over a hold down beam which has previously been positioned on the upper surface of the inlet mixer by a Conventional positioning tool such as that disclosed in U.S. Pat. No. 5,070,589. In this Starting position, each beam tab 58 is located under a riser bracket 54 of the jet pump. The bolt flange 72 of the beam bolt 62 contacts the channel 94 of the inlet mixer flange 96. Once the hold down beam 52 is in this starting position, the tensioning apparatus 100 is positioned over the beam as shown in FIGS. 3-5. The actuating cylinder 140 is then pressurized to extend the actuating rods 128 through the lower base plate 106 in order to rotate the trunnion engaging hooks 120 underneath the beam trunnions 60. After the hooks 120 are engaged under the beam trunnions 60, the hydraulic cylinders 110 are pressurized in order to extend the rams 112 against the flange 96 of the inlet mixer 38. The extension of the rams 112 causes the hooks 120 to press upwardly against the beam trunnions 60. This upward force against the beam trunnions 60 causes the beam tabs 58 to press upwardly against the riser brackets 54. The hydraulic cylinders 110 continue to force the rams 112 against the inlet mixer flange 96 with a beam tensioning force of about 30,000 pounds in order to deform the hold down beam. Upon deformation of the beam, an opening is extended between the bolt flange 72 of the hold down beam and the inlet mixer flange 96. A torque tool (not shown) is inserted through the central apertures 170, 180 of the tensioning apparatus 100 in order to rotate the beam bolt 62 such that the bolt flange 72 is extended to contact the inlet mixer flange 96. Once the bolt flange 72 is tightened against the inlet mixer flange 96, the hooks 120 are rotated out of engagement with the beam trunnions 60. The tensioning apparatus 100 may then be lifted from the tensioned hold down beam. If the hold down beam is to be subsequently removed, the above-noted tensioning steps are reversed in order to detension the beam prior to its removal.

While the present invention has been described in terms of a preferred embodiment, it is to be understood that various adaptions, modifications and changes may be made by those skilled in the art without departing from the scope of the present invention, as set forth in the appended claims.

What is claimed is:

1. Apparatus for tensioning a hold down beam of a nuclear reactor jet pump inlet mixer, the hold down beam having a beam body, a pair of opposed beam tabs and a pair of opposed beam trunnions extending outwardly from the beam body, the apparatus comprising:

a housing positionable over the body of the hold down beam comprising a lower base plate and an upper support plate;

trunnion engaging means rotatably mounted on the lower base plate for engaging the beam trunnions;

reciprocating means coupled to the upper support plate and lower base plate for engaging the inlet mixer adjacent to the beam trunnions; and means mounted between the upper support plate and lower base plate and extending through the lower base plate for selectively actuating the trunnion engaging means.

2. The apparatus of claim 1, wherein the reciprocating means comprises a pair of fluid activated cylinders, each of the cylinders having an extendable ram for engaging the inlet mixer.

3. The apparatus of claim 1, wherein the trunnion engaging means comprises a pair of hooks rotatable into a position under the trunnions.

4. The apparatus of claim 3, wherein the actuating means comprises a fluid cylinder mounted on the upper support plate.

5. The apparatus of claim 4, wherein the fluid cylinder is rotatably mounted on the upper support plate.

6. The apparatus of claim 4, wherein the fluid cylinder comprises a pneumatically actuated piston extendably mounted therein.

7. The apparatus of claim 4, wherein the actuating means comprises an actuating rod connected to each of the hooks and means for reciprocating the actuating rods to rotate the hooks into position under the trunnions.

8. The apparatus of claim 7, wherein the actuating rods are pivotally connected to the hooks.

9. The apparatus of claim 7, wherein each of the actuating rods passes through a hole in the lower base plate.

10. The apparatus of claim 7, wherein the means for reciprocating the actuating rods comprises a bar coupled to the actuating rods and coupled to the fluid cylinder.

11. The apparatus of claim 10, wherein the bar is movable to selected positions between the upper support plate and the lower base plate and contacts an upper surface of the lower base plate when the hooks are disengaged from the trunnions.

12. The apparatus of claim 11, wherein each of the actuator rods passes through a hole in the lower base plate.

13. The apparatus of claim 1, wherein each of the upper support plate and lower base plate comprises an access opening extending substantially through the center thereof for allowing access to a rotatable beam tensioning bolt mounted in the beam body.

14. The apparatus of claim 13, wherein the actuating means comprises a fluid cylinder mounted on the upper support plate adjacent to the access opening thereof.

15. The apparatus of claim 14, wherein the trunnion engaging means comprises a pair of hooks rotatable into position under the trunnions.

16. The apparatus of claim 15, wherein the actuating means comprises an actuating rod connected to each of the hooks, each of the activating rods passing through a hole in the lower base plate adjacent to the access opening thereof.

17. A method of tensioning a hold down beam of a nuclear reactor jet pump inlet mixer, the hold down beam having a beam body, a pair of opposed beam tabs and a pair of opposed beam trunnions extending outwardly from the beam body, and a threaded beam bolt received within a correspondingly threaded channel extending through the beam body, the method comprising:

(a) positioning the hold down beam on an upper surface of the inlet mixer with each beam tab under an inlet riser bracket of the jet pump;

(b) positioning a tensioning apparatus over the hold down beam, the tensioning apparatus comprising
 (i) a housing including a lower base plate and an upper base plate,
 (ii) trunnion engaging means rotatably mounted on the lower base plate,
 (iii) reciprocating means coupled to the upper support plate and lower base plate for engaging the inlet mixer adjacent to the beam trunnions, and
 (iv) actuating means mounted between the upper support plate and lower base plate and extending through the lower base plate for selectively activating the trunnion engaging means;

(c) rotating the trunnion engaging means into engagement with the trunnions;

(d) extending the reciprocating means to engage the inlet mixer and force the beam tabs against the inlet riser brackets to thereby extend an opening between the hold down beam and the upper surface of the inlet mixer;

(e) rotating the beam bolt to extend the bolt into contact with the upper surface of the inlet mixer; and (f) removing the tensioning apparatus from engagement with the hold down beam.

* * * * *